(12) United States Patent
Credle et al.

(10) Patent No.: US 10,087,010 B2
(45) Date of Patent: Oct. 2, 2018

(54) CHECK-OUT STAND WITH TELESCOPING TAKE-AWAY CONVEYOR (71) Applicant: Royston LLC, Jasper, GA (US)

(72) Inventors: Ben Credle, Jasper, GA (US); Brian Watts, Jasper, GA (US)

(73) Assignee: ROYSTON LLC, Jasper, GA (US)

( * ) Notice: Subject to any disclaimer, the term of this patent is extended or adjusted under 35 U.S.C. 154(b) by 0 days.

(21) Appl. No.: 15/588,145

(22) Filed: May 5, 2017

(65) Prior Publication Data

US 2017/0320672 A1   Nov. 9, 2017

Related U.S. Application Data

(60) Provisional application No. 62/332,088, filed on May 5, 2016.

(51) Int. Cl.
| A47F 9/04 | (2006.01) |
| B65G 21/14 | (2006.01) |
| B65G 21/08 | (2006.01) |

(52) U.S. Cl.
CPC ............. *B65G 21/14* (2013.01); *A47F 9/04* (2013.01); *B65G 21/08* (2013.01)

(58) Field of Classification Search
CPC ........... A47F 9/04; B65G 21/00; B65G 21/20; B65G 43/00; B65G 41/001
See application file for complete search history.

(56) References Cited

U.S. PATENT DOCUMENTS

| 4,142,624 A * | 3/1979 | Diver | B65G 43/08 198/419.2 |
| 4,265,336 A * | 5/1981 | Foster | A47F 9/04 186/66 |
| 5,755,308 A * | 5/1998 | Lindstrom | A47F 9/04 186/66 |
| 2002/0112940 A1* | 8/2002 | Dickover | B65G 23/06 198/835 |
| 2012/0187194 A1* | 7/2012 | Svetal | G07G 1/0045 235/470 |

\* cited by examiner

*Primary Examiner* — Mark J Beauchaine
(74) *Attorney, Agent, or Firm* — Lewis, Brisbois, Bisgaard & Smith LLP; Nigamnarayan Acharya (57) ABSTRACT

A check-out stand having a take-away conveyor extending in between a front module and a rear module. The take-away conveyor includes a receiving frame, a conveyor base, and a safety plate mounted on the conveyor base. For ease of installation, safety purposes and servicin, the take-away conveyor may be removed easily with tools. Further, a wire harness system is configured with that provides an AC power supply to the take-away conveyor.

7 Claims, 9 Drawing Sheets

FIG. 10

CHECK-OUT STAND WITH TELESCOPING TAKE-AWAY CONVEYOR

CROSS REFERENCE TO RELATED APPLICATIONS

This application claims priority on U.S. Provisional Patent Application No. 62/332,088, filed on May 5, 2016, which is incorporated by reference herein in its entirety and for all purposes.

TECHNICAL FIELD

This application relates to a check-out stand, and more particularly, to improvements to conveyors and delivery systems for safety reasons.

BACKGROUND

A check-out stand is used in stores have conveyors that receives items and moves to a scanner for checking out by a register clerk. A number of check-out stands are usually placed on the exit of the store so that multiple customers can gather their items and purchase them on the way out of the store.

There are several check-out stands known in the art, out of which one design of a check-out stand includes a front end on which the customer unloads the items. A scanner and register are located at the opposite end of the front end of the stand. The front end usually includes a conveyor for conveying the items toward the scanner and the cash register. A register clerk picks each of the items from the receiving conveyor and either scans the item across the scanner, or manually enters the price and stock number information into the register. The scanned items can be placed on a second conveyor, referred to a "take-away conveyor," that extends to a rear end. The take-away conveyor moves the scanned items at rear end, where a bagging clerk can place each of the scanned items into bags.

Most known checkout assemblies have been designed so that bagging can be best performed by a bagging clerk other than a checkout clerk. Some checkout assemblies have been designed so that bagging may also be performed by the checkout clerk.

Some prior art check-out stands include a take-away conveyor having a leading end which is movable away from the trailing end of the scanner. Withdrawal of the take-away conveyor exposes an area located beneath the leading end of the conveyor. The take-away conveyor is designed to be further retracted to provide access to a pass-through via which the register clerk may access the customer's cart to load filled bags. For ease of description, the configuration and operation in which the take-away conveyor is completely retracted so that the register clerk may pass can be referred to as a "walk-through."

There are a number of problems with a manually-operated retractable, take-away conveyor. For example, U.S. Pat. No. 6,035,971 discloses a check-out stand which is easily configurable to allow scan-and-pass, scan-and-bag, and walk-through operations. A check-out stand has a telescoping take-away conveyor extending between a front end and a rear end. Retraction of the telescoping take-away conveyor allows an area located beneath the leading end of the conveyor to be exposed. If the telescoping take-away conveyor is retracted only a limited amount, the single bag may be inserted between the leading end of the telescoping take-away conveyor and the trailing end of the scanner.

This application provides improvements to a check-out stand. There is always a need for a safer check-out stand.

SUMMARY

This application provides improvements to a check-out stand. The check-out stand can include a take-away conveyor that is safer and that can be easier to manufacture, install and service. For ease of installation, safety purposes and servicing, parts of the take-away conveyor may be removed easily with or without tools. Further, a wire harness system can be included to provide an AC power supply to the take-away conveyor. This harness can reduce the heat produced by the motor, which can result in a safer check-out stand.

In accordance with an exemplary embodiment, a take-away conveyor for a check-out stand is provided. The take-away conveyor can be automatically reconfigurable between the scan-and-pass, walk-through, and scan-and-bag positions. The check-out stand includes a take-away conveyor mounted within the check-out stand in between a front module and a rear module and comprising a receiving frame, a conveyor base, a safety plate mounted on the conveyor base, a continuous belt and a plurality of rollers. The receiving frame is mounted to the conveyor base and may be capable of expanding and lengthening to extend toward and away from the front module and the rear module, the receiving frame defining a conveying surface. The receiving frame includes side rails, the side rails allow the receiving frame to smoothly slide along a stand of the conveyor base.

In one embodiment, a powered roller can be configured at the trailing end, a front idler roller may extend parallel to the powered roller at the lower portion of the opposite end of the conveyor base, a rear idler roller may extend parallel to the powered roller mounted at the trailing end, and a friction roller is attached at the leading top edge of the receiving frame. The continuous belt is wrapped in tension around the powered roller, the front idler roller, the rear idler roller and the friction roller rollers, an upper run of the receiving frame defining a conveying surface, the roller being movable with the continuous belt and relative to the conveyor base to maintain the tension in the continuous belt and being securable in the stand. The powered roller is operable to rotate the continuous belt, and the operation of the powered roller serves to automatically extend the conveyor from a first position to a second position.

In accordance with another embodiment, the plate is mounted on the conveyor base is for safety purpose and is preferably manufactured of an ultra-high molecular weight plastic for isolating motor and rollers vibration so as not to pass such vibrations to the check-out stand. The wire harness system can be attached to a motor on the powered roller that provides an AC power supply to the take-away conveyor. Further the wire harness system decreases temperature fluctuations within the check-out stand caused by heat from a motor and reduces or eliminate vibrations and provides stability in the check-out stand.

In accordance to another embodiment, AC power is supplied to the powered roller by the wire harness system so that it rotates the continuous belt. The receiving frame extends to receive scanned items and deliver items to bagging station. The wire harness system includes a plug, "ON-OFF" switch, a harness main body having a plurality of high voltage electric wires for outputs, a motor-side connecting portion disposed at one end of the harness main body for connection to the motor, and a Double Pole Double Throw (DPDT) "ON-OFF" switch that has two inputs and four outputs. Two outputs can be configured to provide power in primary winding and another two outputs can be configured to provide power in secondary windings of the motor in the powered roller. To avoid the current following through the secondary windings, the harness system has a normally open solid state relay across the primary windings of the wire harness system connecting to the motor in such a way that when power is turned off to the primary windings, the solid state relay will break the connection to the secondary windings. The wire harness system can be connected to the motor's electrical housing and the connecting plug pin or socket and the other parts are high temperature resistant materials, so that the take-away conveyor is resistant to high current, high resistance, low temperature resistance and other advantages.

BRIEF DESCRIPTION OF THE DRAWINGS

Certain exemplary embodiments will be described with reference to the following drawings. The drawings and the associated descriptions are provided to illustrate embodiments of the invention and not to limit the scope of the invention.

DETAILED DESCRIPTION

Exemplary embodiments now will be described more fully hereinafter with reference to the accompanying drawings, in which some, but not all embodiments are shown.

Figure 1:
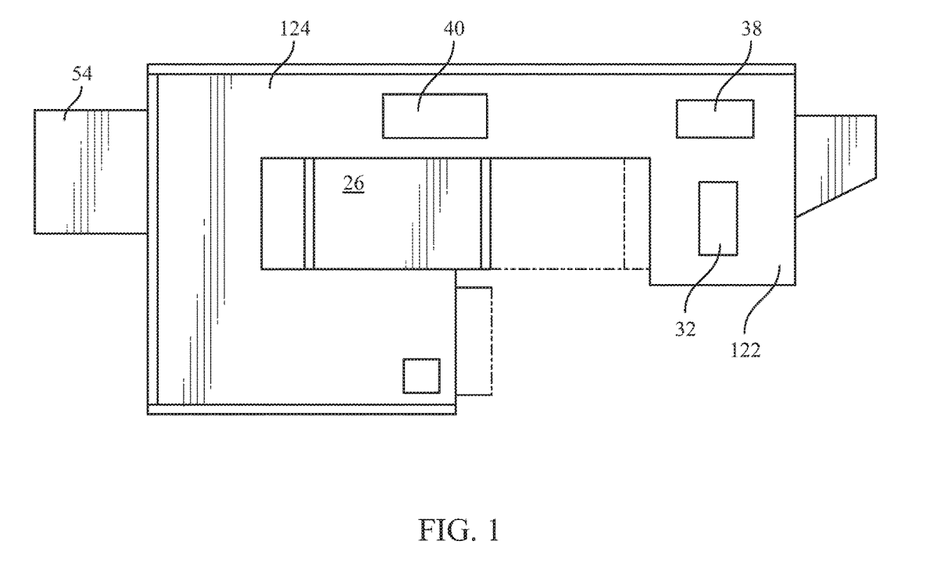
FIG. 1 is a top view of a check-out stand incorporating a take-away conveyor in accordance with an embodiment of the present invention.

FIG. 1 illustrates operation and structure of a check-out stand 1 known in the art. The check-out stand 1 includes a take-away conveyor 26 extending from the front module to the rear module. As illustrated in the FIG. 1, a customer places groceries or other items on the front module 122 and the items are conveyed to a register clerk for scanning. The scanned items are then placed on the take-away conveyor 26. The take-away conveyor 26 moves or deposits the scanned items at the trailing end of the rear module 124, where a clerk can place each of the scanned items into bags. As illustrated in the FIG. 1, a customer can place the items to the load area 31 and can move the items toward the scanner 32. After scanning the items, the register clerk places the scanned items on the take-away conveyor 26. The items move along the take-away conveyor 26 to bagging station 54 and the items are bagged at the bagging station 54 by the clerk. Further on the customer side adjacent to the scanner 32, is the keyboard 38, as well as a check writing surface 40. The check writing surface 40 is arranged so that it may be easily accessed by a customer standing in a customer waiting area. For better understanding, the right side of FIG. 1 is referred to as the "leading," or front end of the check-out stand 1, and the left side of FIG. 1 is referred to as the "trailing," or rear, end of the check-out stand 1. The side of the check-out stand at the bottom of FIG. 1 is referred to as the "register clerk" side, and the side at the top of FIG. 1 is the "customer" side of the check-out stand 1.

In conjunction with the FIG. 1, certain embodiments provide improvements to the check-out stand 1. The improvements can render check-out stand 1 safer and easier to manufacture, install and service. Further provides ease of installation, a safety plate is provided that may be removed easily with tools. Further, the check-out stand may include a wire harness system.

Now referring to the FIGS. 2, 3, 4, 5, 6, 7, 8a, 8b and 8c, an improved take-away conveyor 26 includes a receiving frame 2 slidably mounted on a conveyor base 4 with a mounting stand 6. On the conveyor base 4, the receiving frame 2 is mounted with a plate 8. The receiving frame 2 extends parallel to the conveyor base 4, and is mounted so that sliding occurs—the parallel relationship is maintained.

Figure 2:
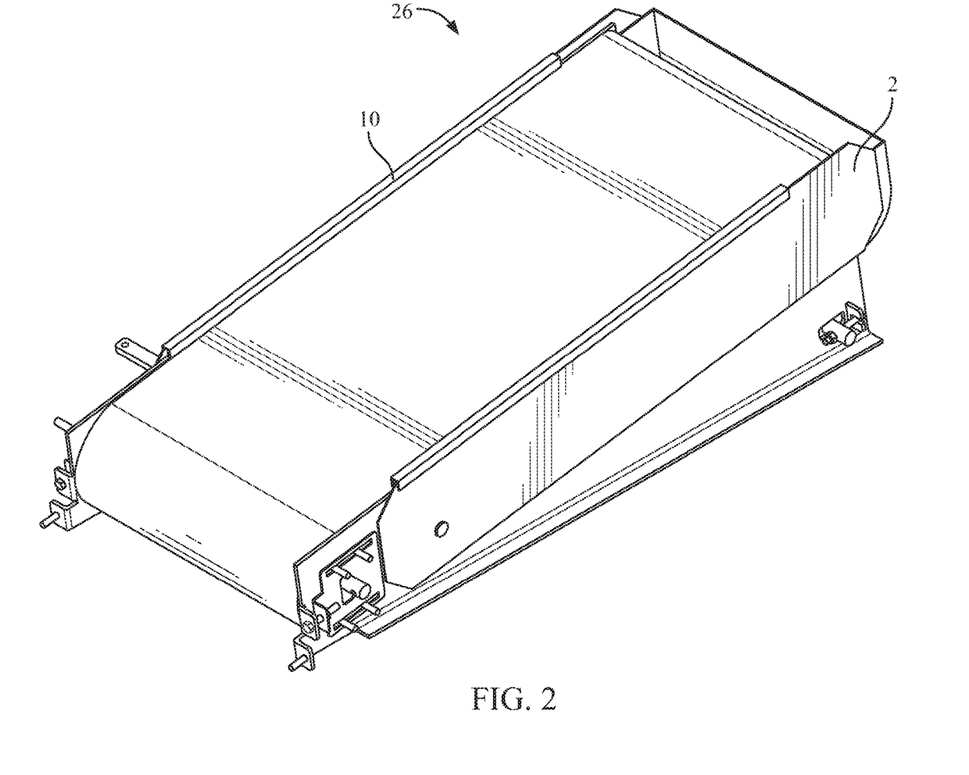
FIG. 2 is a perspective view of the take-away conveyor in accordance with an embodiment of the present invention.
Figure 3:
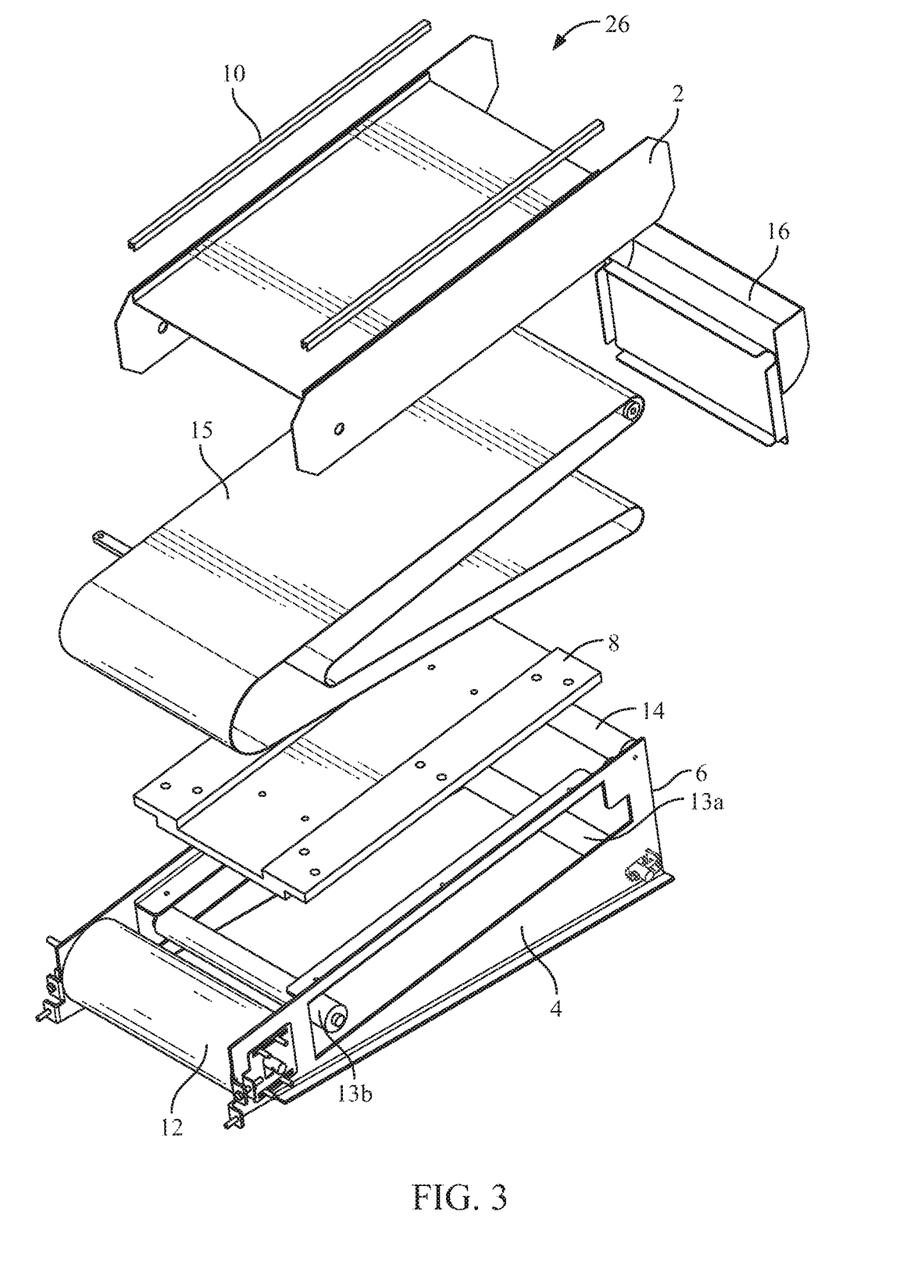
FIG. 3 is a perspective exploded view of the take-away conveyor in accordance with an embodiment of the present invention.
Figure 4:
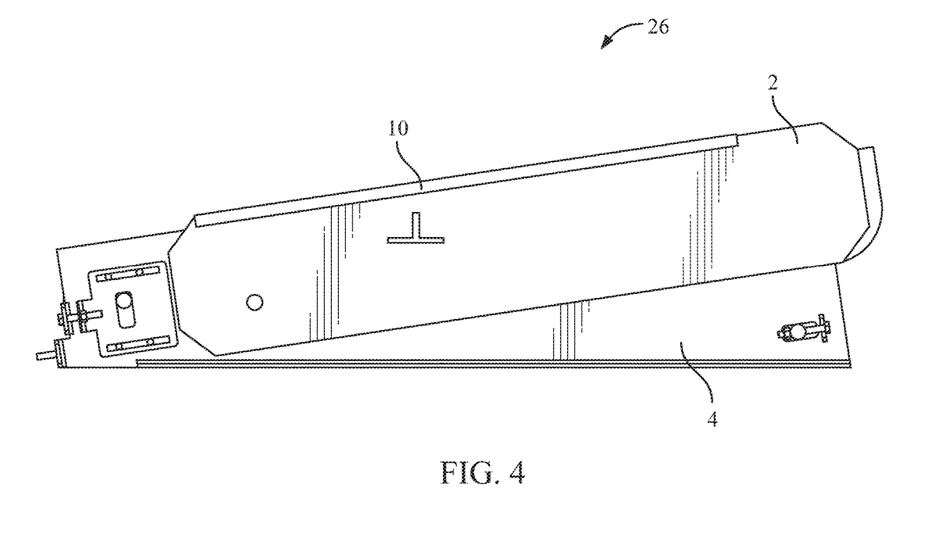
FIG. 4 is a side view of the take-away conveyor in accordance with an embodiment of the present invention.

The receiving frame 2 has a plate 8 and a conveyor base 4. The conveyor base includes side stand 6 and the receiving frame 2 includes side rails 10. The side rails 10 allow the receiving frame 2 to smoothly slide along the stand and limit lateral movement of the receiving frame 2 relative to the conveyor base 4. The side rails 10 also serve as a mechanical stop that limits the extension of the receiving frame 2 relative to the conveyor base 4 so that the take-away conveyor 26 may only slide outward to the front end 122. The side rails 10 are elongated guides extending along the length of both sides of the receiving frame 2.

The take-away conveyor 26 includes a powered roller 12 that extends transversely to and perpendicularly across the trailing end of the conveyor base 4. The powered roller 12 includes a conventional motor powered by the wire harness system. A front idler roller 13a extends parallel to the powered roller 12 at the lower portion of the opposite end of the conveyor base 4. A rear idler roller 13b also extends parallel to the powered roller 60 and is mounted at the trailing end of the receiving frame 2. The diameters of the front and rear idler rollers 13a, 13b are preferably the same, but the diameter of the powered roller 12 is greater than the diameter of the front and rear idler rollers 13a, 13b. The wire harness system 20 is attached to the end of the motor. The wire harness system 20 includes a mounting portion 21, where wires 22 transmit electrical current to the motor are positioned as clearly shown in the enlarged view of the system in FIGS. 8a, 8b and 8c. The wire harness system 20 further includes a board 23 having switches 24. The wire harness system 20 decreases temperature fluctuations within the conveyor system caused by motor heat, virtually eliminates vibrations, and improves stability of the check-out stand 1.

A friction roller 14 is attached the leading top edge of the receiving frame 2. The friction roller 14 is preferably approximately the same diameter as the front idler roller 13a and rear idler rollers 13b. A continuous belt 15 is mounted in tension around the rollers 12, 13a, 13b, 14. The continuous belt 15 winds around and over the powered roller 12 and friction roller 14, and follows a serpentine path around the friction roller 14, extending backward and around the rear idler roller 13b, forward and then around the front idler roller 13a, and back to the powered roller 12.

The friction roller 14 can be mounted at the front end at top of the stand 6. The front idler roller 13a and rear idler roller 13b are mounted on the conveyor base so that the section of the continuous belt 15 that extends between the two rollers extends parallel to the section of the continuous belt 15 that serves as the conveying surface. Likewise, the rear idler roller 13b is mounted relative to the friction roller 14 so that the section of the continuous belt 15 that extends between the two rollers extends parallel to the conveying surface. Because each of these rollers 12, 13a, 13b, 14 is mounted either on the receiving frame 2 or the conveyor base 4, and the conveyor base and receiving frame 2 are mounted to maintain a parallel orientation, the parallel relationships of these sections of the continuous belt 15 are maintained as the receiving frame 2 is moved outward relative to the conveyor base 4.

Figure 5:
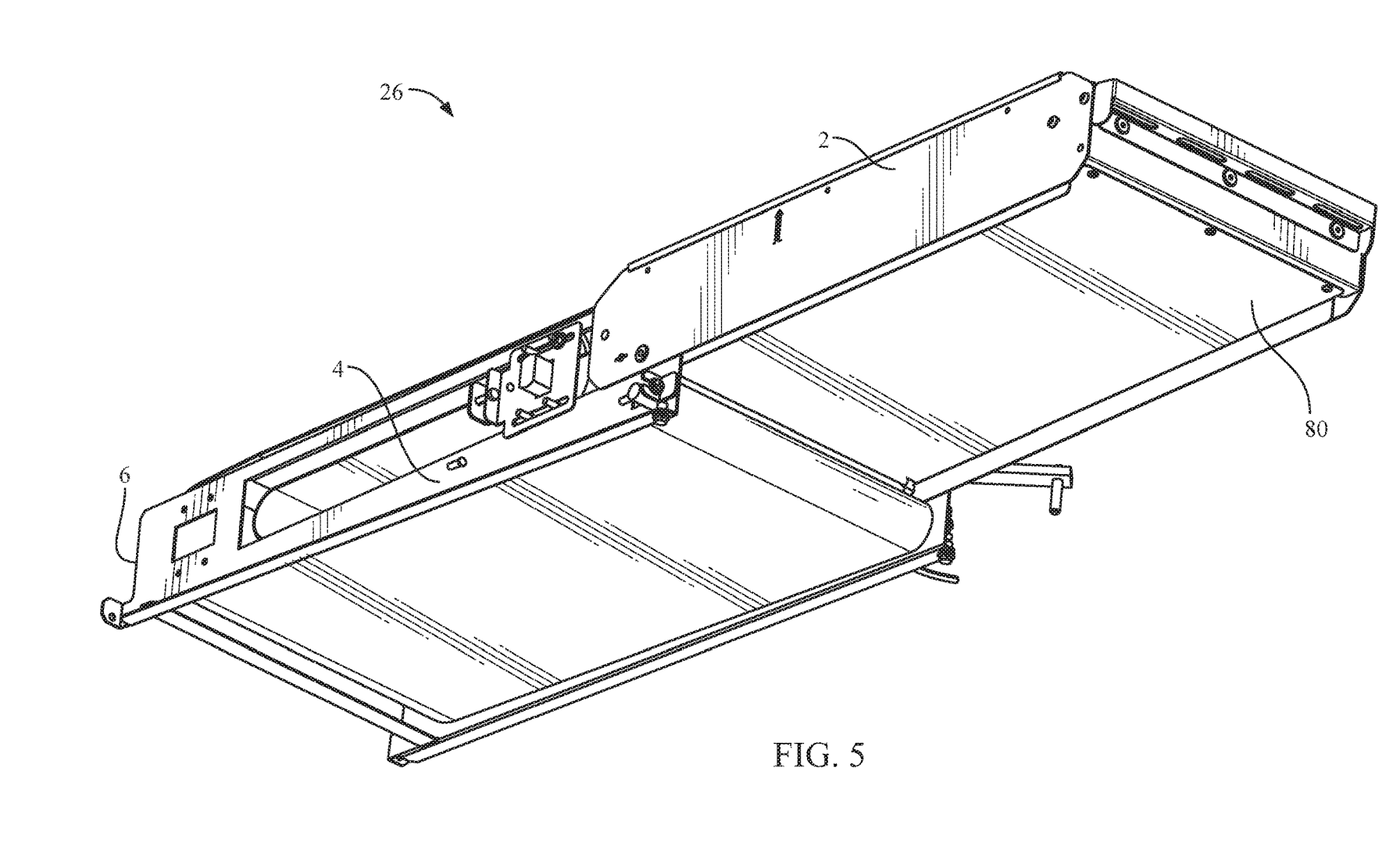
FIG. 5 is an extended view of the take-away conveyor in accordance with an embodiment of the present invention.
Figure 6:
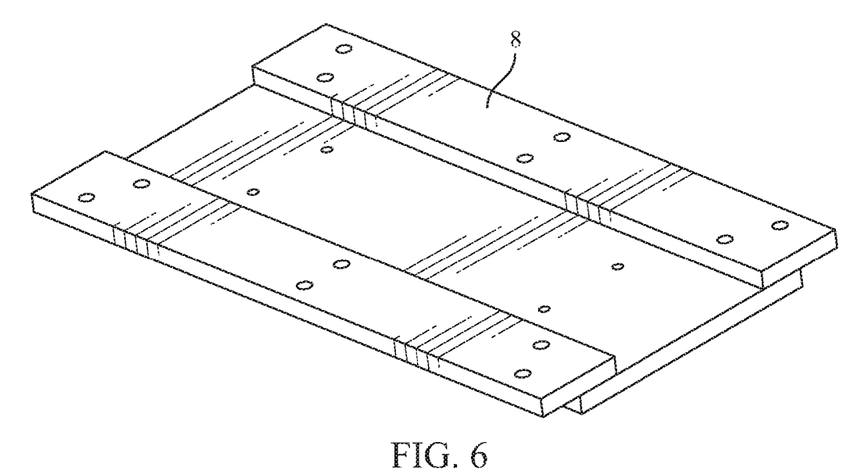
FIG. 6 is a perspective view of a plate of the take-away conveyor in accordance with an embodiment of the present invention.
Figure 7:
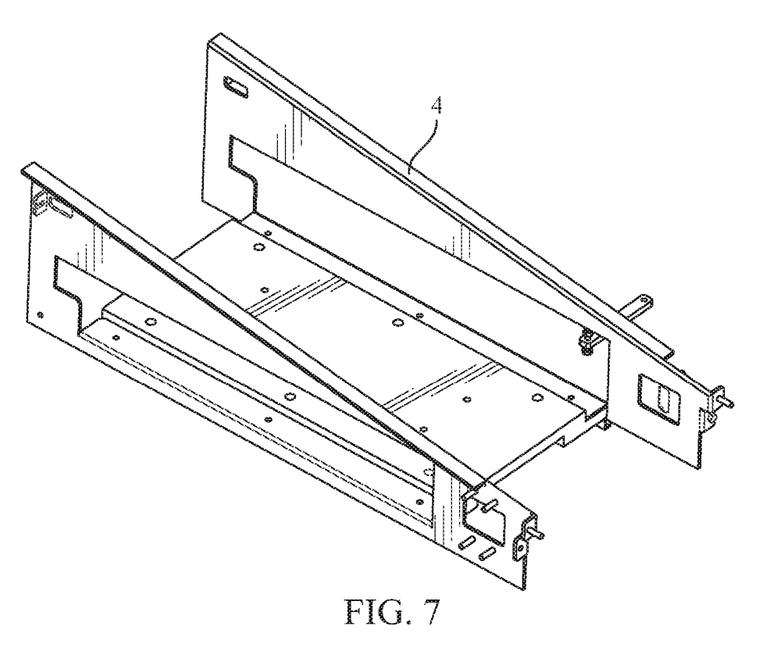
FIG. 7 is a perspective view of a conveyor base of the take-away conveyor in accordance with an embodiment of the present invention.

The plate 80 is provided for safety purposes and can manufactured of an ultra-high molecular weight plastic. The plate 80 isolates the motor and rollers and reduces vibration vibrations to the check-out stand 1. The plate 80 prevents clothing, articles, or persons from tapering with or contacting the roller 12, 13a, 13b, 14, which are mounted either on the receiving frame 2 or the conveyor base 4. In an exemplary use and application as shown in FIG. 5, the take-way conveyor 26 is in an extended position having the safety plate 80 mounted on the receiving frame 2, where the safety plate 80 is not removable without tools.

The conveyor base 4 and the receiving frame 2 each have a rectangular box configuration, and the receiving frame 2 is mounted along the top of the conveyor base 4 to allow sliding movement. The sliding arrangement of the receiving frame 2 and the conveyor base 4 forms the "telescoping" function of the take-away conveyor 26. A cover plate 16 is mounted on the front end of the take-away conveyor 26 that encloses the receiving frame 2 with the continuous belt 15.

Figure 8A:
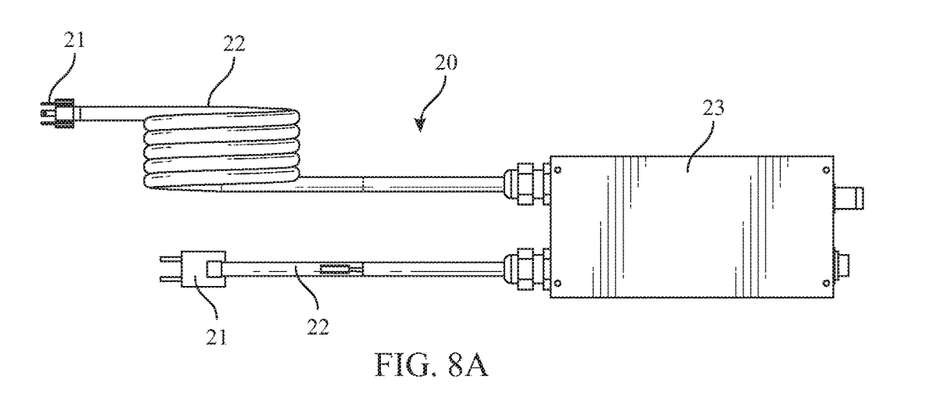
FIG. 8a is a side view of a wire harness system of the take-away conveyor in accordance with another embodiment of the present invention.
Figure 8B:
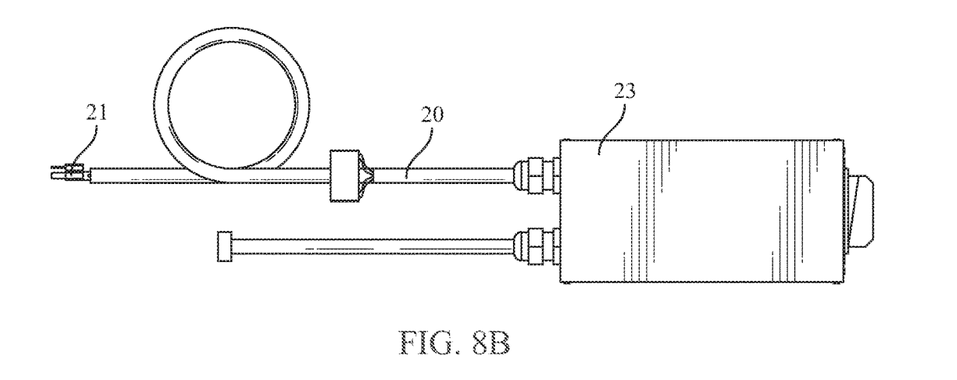
FIG. 8b is a another side view of a wire harness system of the take-away conveyor in accordance with another embodiment of the present invention.
Figure 8C:
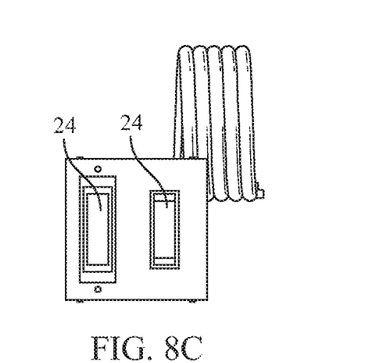
FIG. 8c is a front view of a wire harness system of the take-away conveyor in accordance with another embodiment of the present invention.

Further referring to the FIGS. 8a, 8b and 8c, AC power is supplied to the powered roller 12 by the wire harness system 20 so that it rotates a continuous belt. The continuous belt 15 is travelling in the "reverse," direction, such that the continuous belt 15 conveys items towards, instead of away from, the scanner 32. However, simply reversing the rotation of the powered roller 12 will cause the take-away conveyor 26 to retract. To improve safety, the powered roller 12 is attached to the wire harness system 20 to retract and extend the receiving frame 2. Further to prevent the take-away conveyor 26 from retracting once the take-away conveyor is extended, the direction of the powered roller 12 is reversed to the counter clockwise direction.

Figure 9:
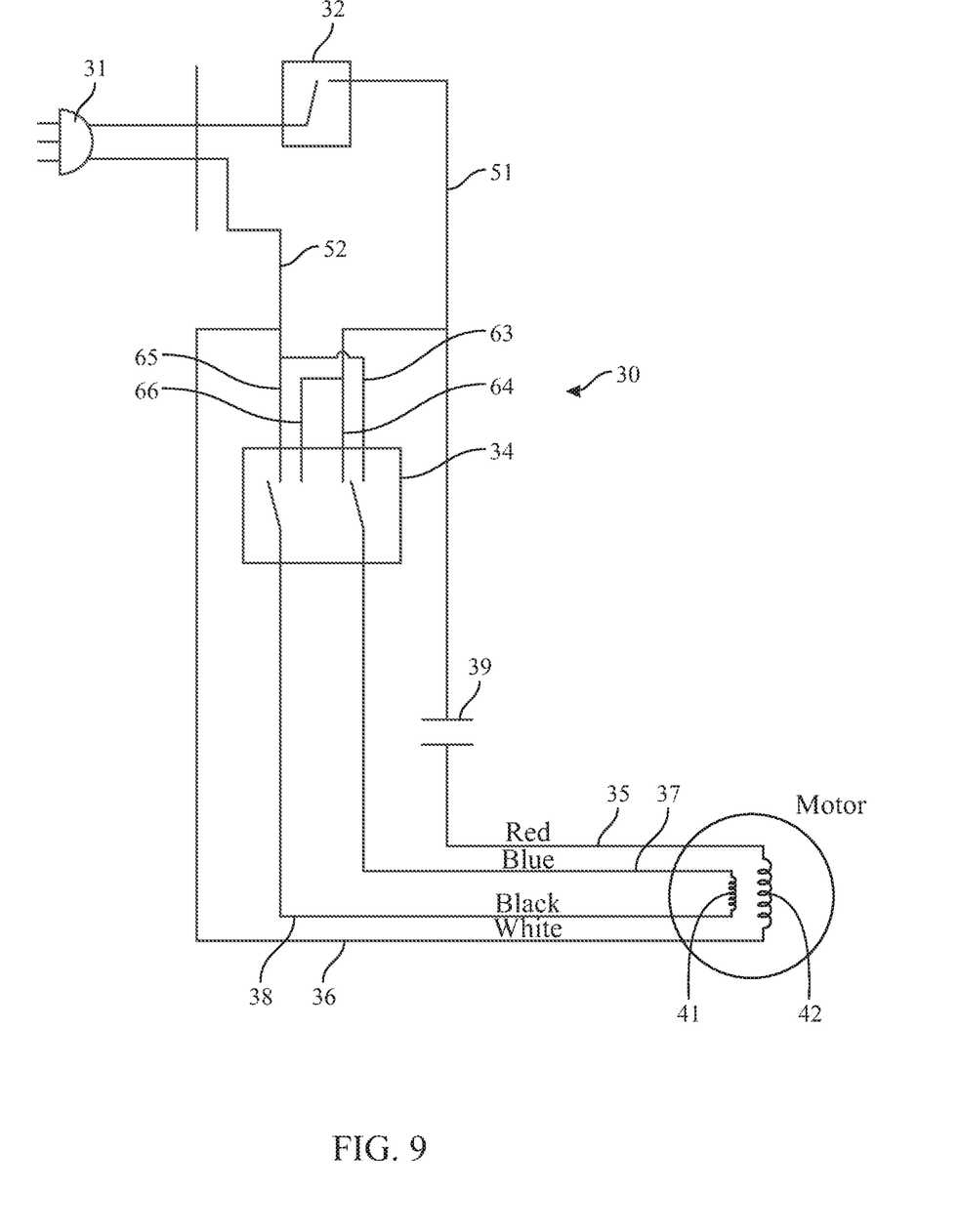
FIG. 9 illustrate internal electrical wiring harness known in the prior art.

Generally, a motor cable and motor is configured to generate a three-phase alternating current to drive the motor. As shown in FIG. 9, the motor cable include a plug 31, "on-off" switch 32, a harness main body 30 having a plurality of high voltage electric wires for outputs. A motor-side connecting portion is disposed at one end of the harness main body for a connection to the motor. The plug 31 is the connecting portion disposed at the other end of the harness main body for connecting on a board of a power source. This example includes a Double Pole Double Throw (DPDT) "ON-OFF" switch 34 that has two inputs 61,62 and four outputs 63, 64, 65, 66. Each input 61 or 62 has two corresponding outputs 63, 64 or 65, 66 that can connect to 4 different outputs 35, 36, 37, 38 interposed at a middle portion of the harness main body. In an exemplary use and application shown in the FIG. 9, the output 35 further includes a capacitor 39 of 15 µF. The outputs 37 and 38 are configured to provide power in primary windings 41 and the outputs 35 and 36 are configured to provide power in secondary windings 42. However, the problem in the prior art wiring harness 30 are shown in the FIG. 9, if the operator does not turn off the on-off switch 32, which leaves the DPDT reversing switch 34 in the center "off" position—that is, there will be current going through the secondary windings 42 of the motor.

Figure 10:
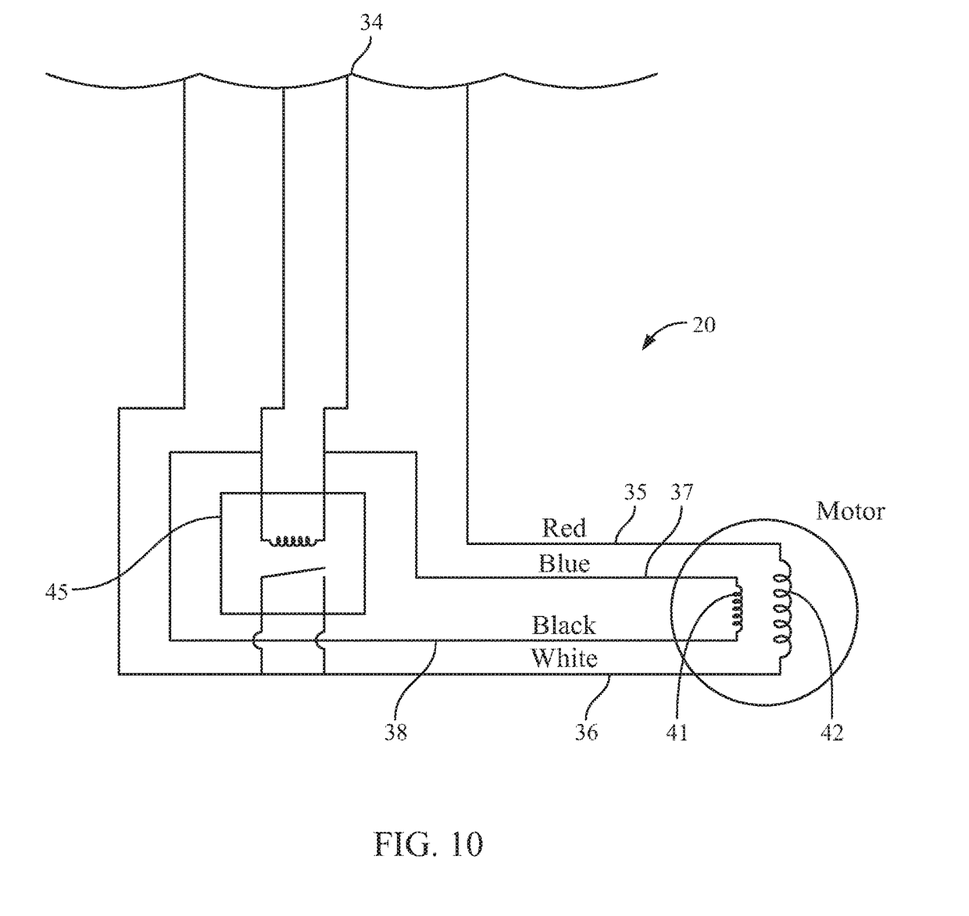
FIG. 10 illustrate internal electric wiring harness of the wire harness system of FIGS. 7a, 7b and 7c in accordance with another embodiment of the present invention.

To avoid the current following through the secondary winding 42, the harness system includes a normally open solid state relay 45 across the primary windings 41 of the wire harness system 20 connecting to the motor in such a way that when power is turned off to the primary windings 42, the solid state relay 45 will break the connection to the secondary windings 42, as shown is the FIG. 10. NO means "normally open" without an input signal. When the contacts are normally "Open" in the case of a solid state relay 45, the output is "OFF". When an input signal is applied, the contacts then "Close". Further, the solid state relay 45 is SPST-NO solid state relay. In exemplary application shown in the FIG. 9, the outputs 33, 36, 37, 38 coming from the Double Pole Double Throw (DPDT) "ON-OFF" switch 34 are connected to the motor. The wire harness system 20 connected to the motor's electrical housing and the connecting plug pin or socket and the other parts are high temperature resistant materials, so that the take-away conveyor 26 is resistant to high current, high resistance, low temperature resistance and other advantages.

While the wire harness system 20 can have electrical systems and features, the prevention of hazardous operation may be central. Further includes push-pull self-locking plug and socket connectors for easy installation and removal.

The wire harness system 20 positively propagates a vibration from the motor or from the take-away conveyor 26 to a specific range. Further, the wire harness system 20 absorbs such vibrations. The wire harness system 20 includes a plurality of shielded electric wires. Therefore, the vibration or the like can be absorbed effectively. Thereby, the noise, the damage or the like can be prevented from generating.

In accordance with another embodiment of the present invention, the wire harness system 20 is attached to the motor on the powered roller 12 that provides an AC power supply to the take-away conveyor 26. Further the wire harness system 20 decreases temperature fluctuations within the check-out stand caused by heat from a motor and reduces the vibrations and provide stability in the check-out stand 1.

Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

What is claimed is:

1. A check-out stand, comprising:
   a take-away conveyor mounted within the check-out stand in between a front module and a rear module, wherein the conveyer has a receiving frame, a conveyor base, a first plate mounted on the conveyor base, a continuous belt and a plurality of rollers, the receiving frame mounted to the conveyor base, the receiving frame defining a conveying surface, the continuous belt wrapped in tension around a powered roller, and a roller is movable with the continuous belt and relative to the conveyor base to maintain the tension in the continuous belt;
   a safety plate;
   a double pole double throw switch, wherein the switch is connected to a motor; and
   a wire harness system attached to the motor on the powered roller, wherein wires communicate electrical current to the motor and the wire harness system includes a normally open solid state relay across primary windings and across the primary windings of the wire harness system connecting to the motor in such a way that when power is turned off to the primary windings, the solid state is connected to the secondary windings so to break the connection.

2. The check-out stand of claim 1, wherein side rails slide longitudinally and serve as a mechanical stop that limits the extension of the side rails relative to the conveyor base so that the receiving frame being capable of expanding and lengthening to extend toward and away from the front module and the rear module.

3. The check-out stand of claim 2, wherein the safety plate is mounted onto the conveyor base.

4. The check-out stand of claim 1, wherein the wire harness system decreases temperature fluctuations within the check-out stand caused by motor heat.

5. The check-out stand of claim 1, wherein the normally open solid state relay across the primary windings prevents the current following through the secondary windings when the power is turned off to the primary windings, wherein the solid state relay will break the connection to the secondary windings.

6. The check-out stand of claim 5, wherein the safety plate is removably mounted to the underside of the conveyor to prevent persons from contacting the underside of the belt and the removal of the safety plate requires tools.

7. The check-out stand of claim 1, wherein the safety plate is mounted to the underside of the conveyor to prevent persons from contacting the underside of the belt.

* * * * *